(12) United States Patent
Li et al.

(10) Patent No.: US 8,451,779 B2
(45) Date of Patent: May 28, 2013

(54) EMERGENCY SUPPORT FOR VOICE OVER INTERNET PROTOCOL (VOIP) OVER MIXED MACRO AND FEMTO NETWORKS

(75) Inventors: Mingxing Li, San Jose, CA (US); Peter Hu, Pleasanton, CA (US); Xuming Chen, San Ramon, CA (US); Priscilla Lau, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 312 days.

(21) Appl. No.: 13/012,452

(22) Filed: Jan. 24, 2011

(65) Prior Publication Data

US 2012/0188941 A1     Jul. 26, 2012

(51) Int. Cl.
*H04W 4/00* (2009.01)
(52) U.S. Cl.
USPC ............................................ 370/328; 370/329

(58) Field of Classification Search
USPC .................................................. 370/328, 329
See application file for complete search history.

(56) References Cited

U.S. PATENT DOCUMENTS

| 2009/0268635 A1* | 10/2009 | Gallagher et al. ............. 370/254 |
| 2010/0210273 A1* | 8/2010 | Jun et al. ...................... 455/450 |
| 2011/0170517 A1* | 7/2011 | Bakker et al. ................. 370/331 |

* cited by examiner

*Primary Examiner* — Kenny Lin

(57) ABSTRACT

A device receives, from an emergency call server (ECS), a query that includes a telephone number, a femto global positioning system (GPS) identifier, and an Internet protocol (IP) address associated with a user equipment (UE) placing an emergency call. The device obtains a serving cell E-UTRAN cell global identifier (ECGI) of the UE based on the query, and determines whether the ECGI is a macro ECGI associated with a base station or a femto ECGI associated with a femto cell.

25 Claims, 11 Drawing Sheets

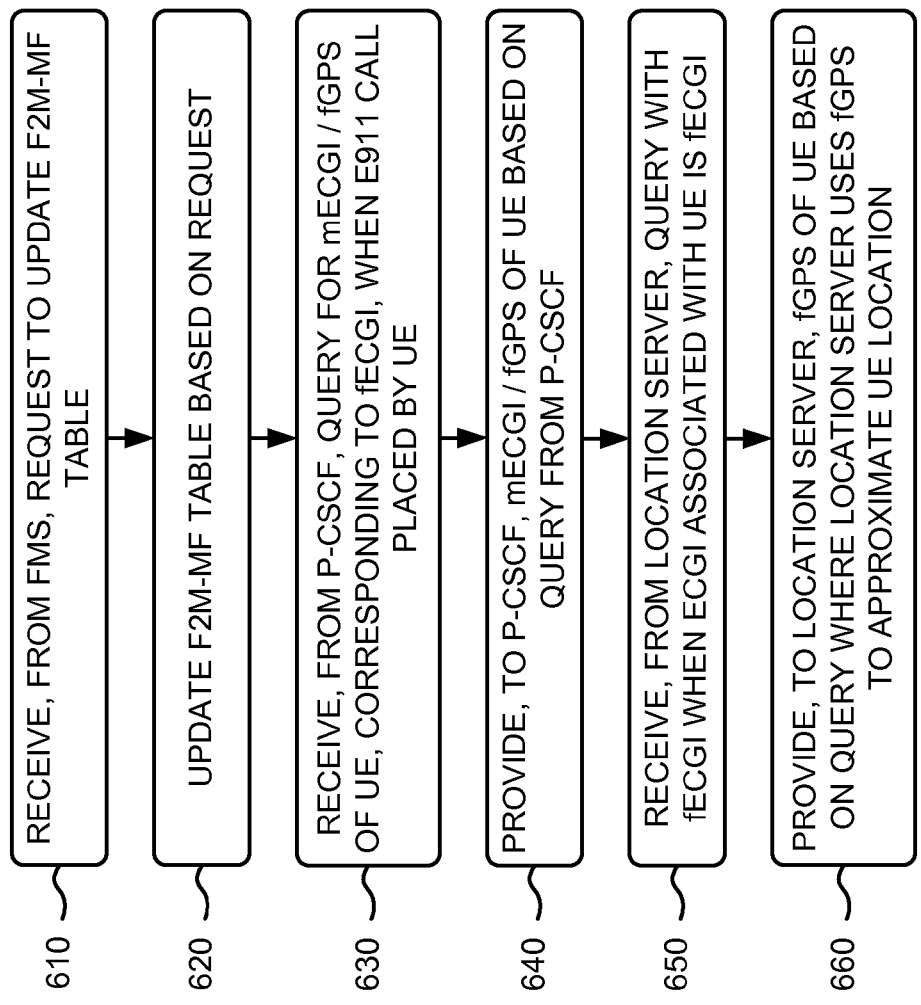

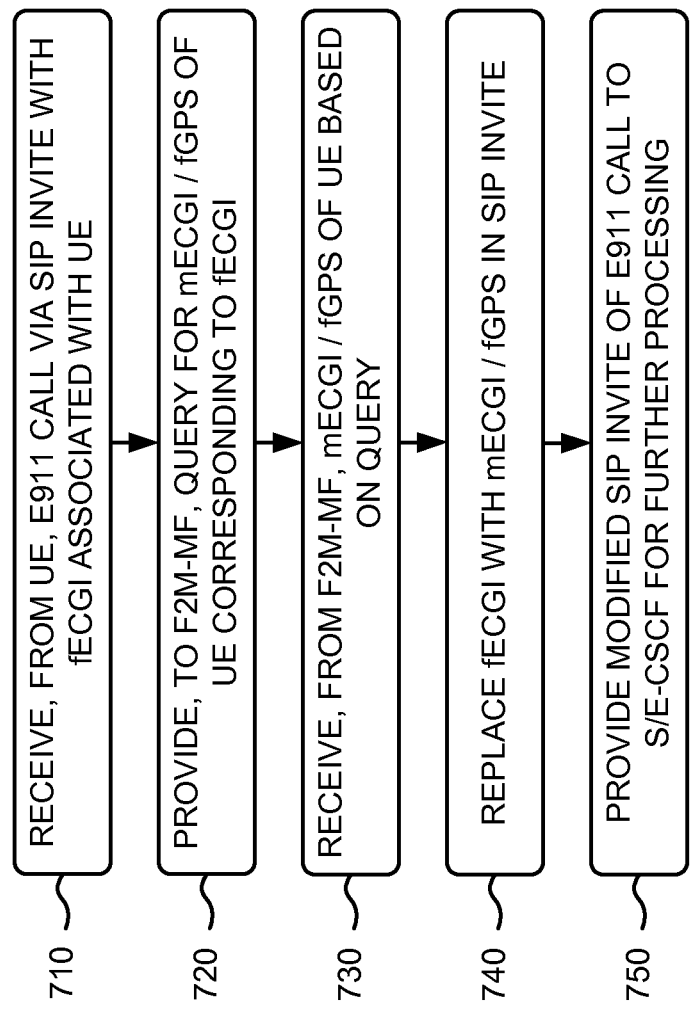

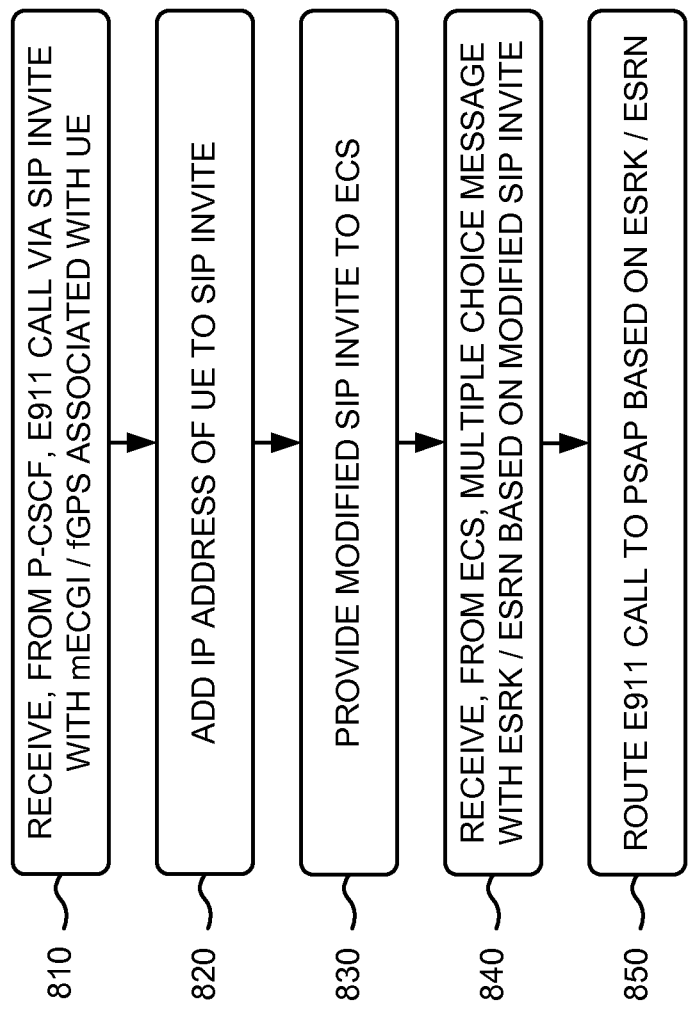

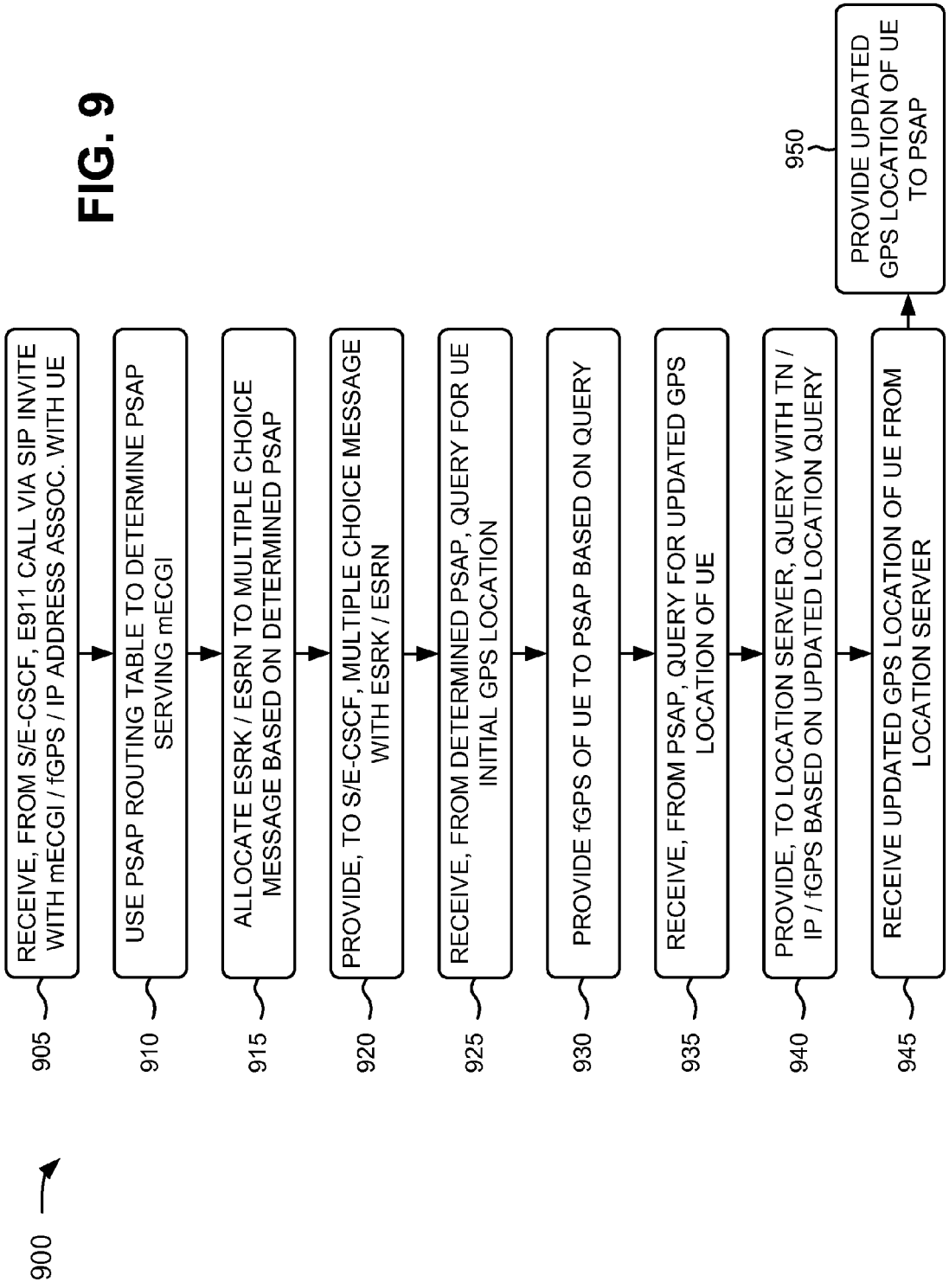

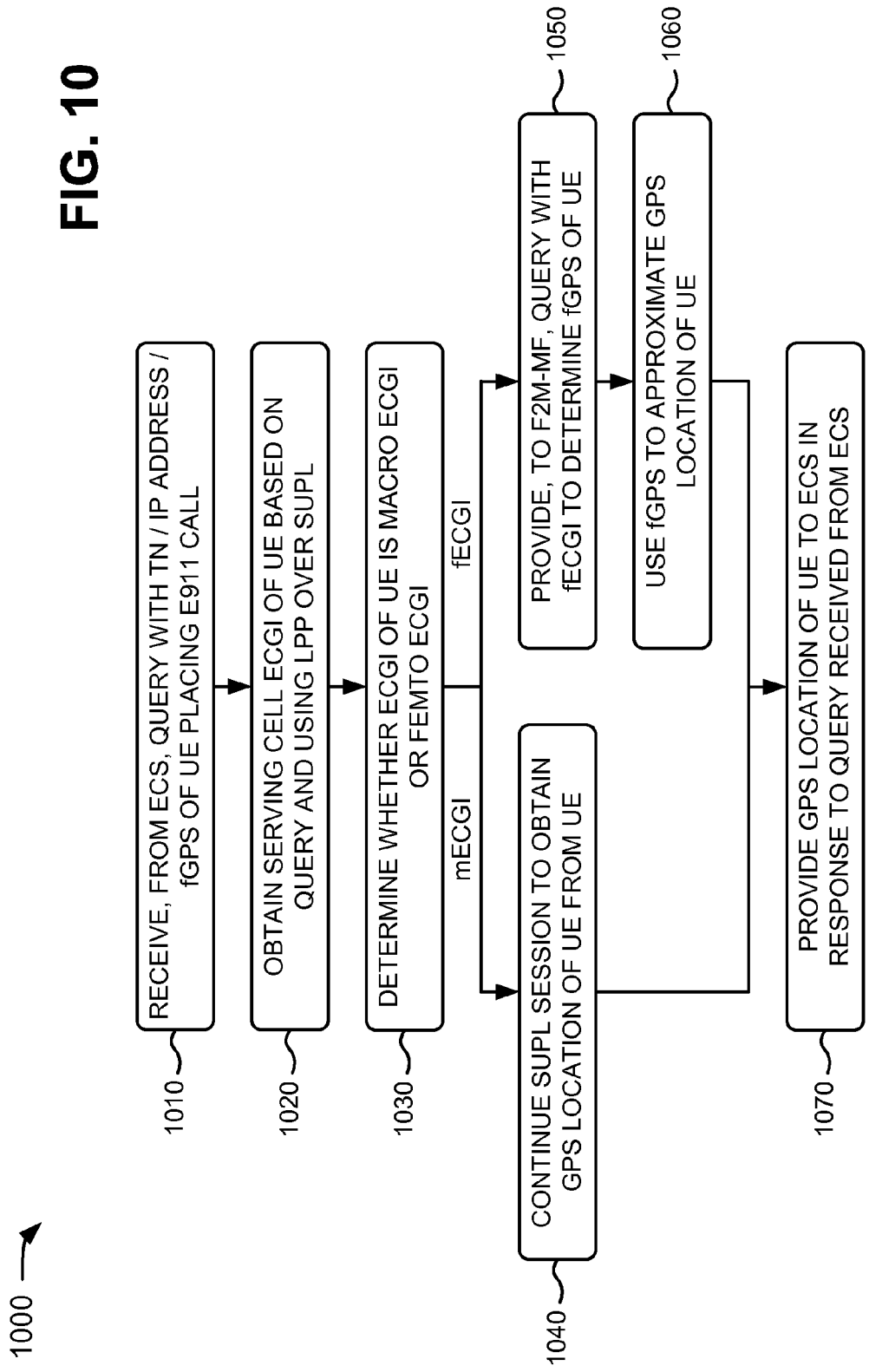

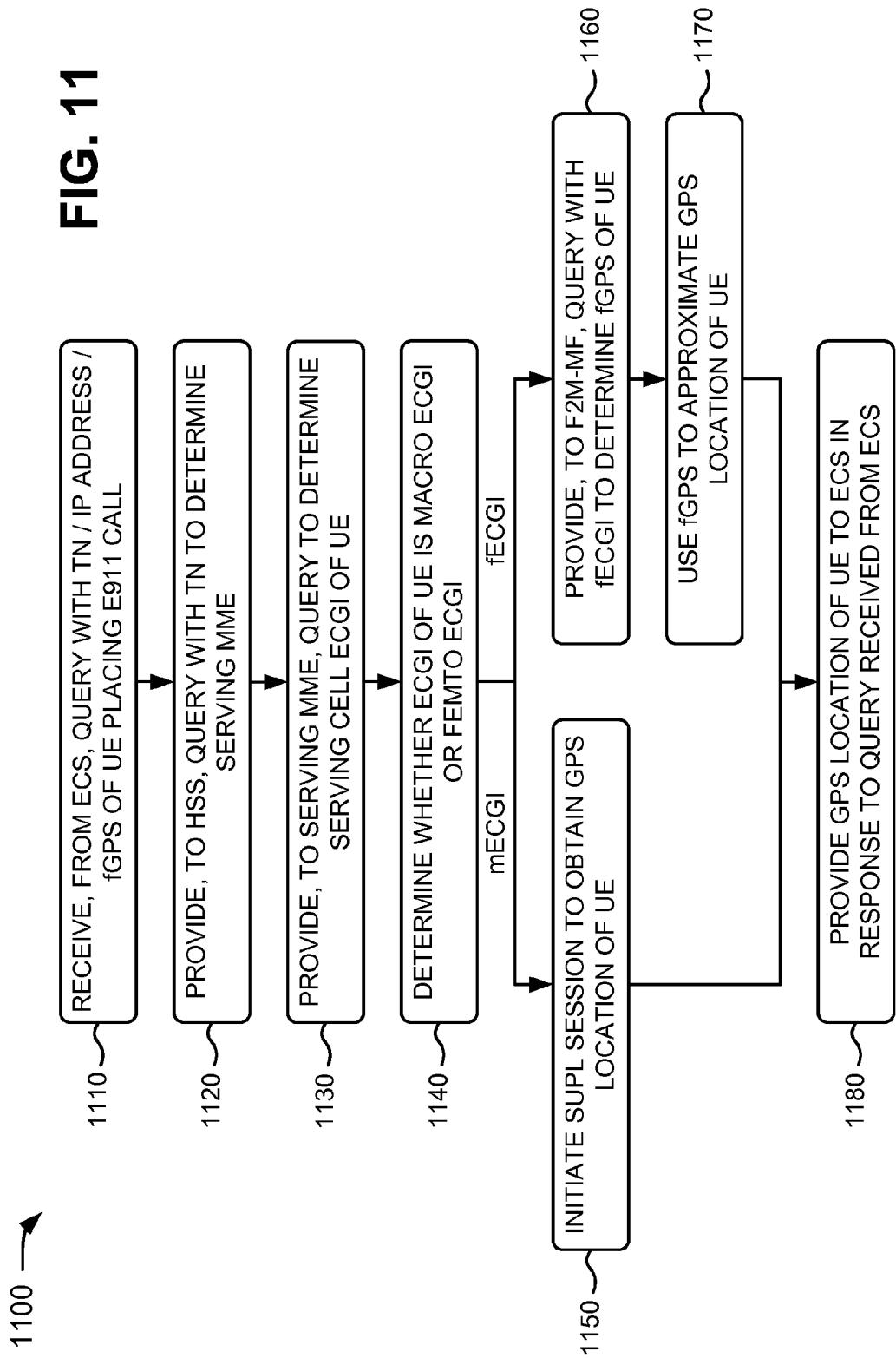

US 8,451,779 B2

EMERGENCY SUPPORT FOR VOICE OVER INTERNET PROTOCOL (VOIP) OVER MIXED MACRO AND FEMTO NETWORKS

BACKGROUND

To support voice over Internet protocol (VoIP) over a macro network (e.g., a Long Term Evolution (LTE) network, an evolved high rate packet data (eHRPD) network, mixed LTE/eHRPD networks, etc.), enhanced emergency calls (or "E911" calls) must be supported. The macro network-based VoIP must provide a caller's (e.g., connected to the network via user equipment (UE), such as a mobile communication device, a cell phone, a mobile terminal, a smart phone, a personal digital assistant (PDA), etc.) initial and updated locations to a correct public safety answering point (PSAP). There are different ways of determining a location of a UE making an E911 call. For example, triangulation of received signals by UE from multiple cell towers (e.g., with prior knowledge of the cell tower locations) may be used to determine the location of the UE. If the UE supports global positioning system (GPS) and GPS satellite signals can be received by the UE, the GPS location of the UE can be obtained (e.g., by a network location server) by using various protocols (e.g., the open mobile alliance (OMA) secure user plane location (SUPL) protocol, the LTE location positioning protocol (LPP), etc.).

A femto cell is a small cellular base station that connects to a service provider network via broadband. A femto cell typically supports two to four mobile communication devices (e.g., UEs) in a residential setting and eight to sixteen mobile communication devices in a business setting. To support VoIP over a femto network, E911 calls must be supported as well. The femto network-based VoIP must provide a caller's (e.g., connected to the network via a UE) initial and updated locations to a correct PSAP. However, determining a position of a UE in a femto network is difficult because a femto network is typically deployed within a building where receiving a GPS signal from the UE is often impossible. Using triangulation to determine a location of a femto-based UE is often not possible either because the UE typically receives signals only from the femto cell and the femto cell's location is typically not known to a network location server. Thus, attempts to use the SUPL protocol to obtain the location of a femto-based UE will often fail.

Supporting E911 becomes even more complicated when a UE is associated with both a macro network and a femto network. For example, the UE may place the E911 call on a femto network, and the E911 call may be handed over to a macro network when the UE changes locations. Alternatively, the UE may place the E911 call on a macro network, and the E911 call may be handed over to a femto network when the UE changes locations. In both scenarios, the UE's initial location and updated location need to be known.

BRIEF DESCRIPTION OF THE DRAWINGS

FIG. 6 is a flow chart of an example process for determining a location of a UE placing a VoIP-based E911 call according to implementations described herein;

FIG. 7 is a flow chart of an example process for modifying a session initiation protocol (SIP) INVITE associated with an E911 call according to implementations described herein;

FIG. 8 is a flow chart of an example process for determining a correct PSAP for a VoIP-based E911 call according to implementations described herein;

FIG. 9 is a flow chart of an example process for determining initial and updated locations of a UE placing a VoIP-based E911 call according to implementations described herein;

FIG. 10 is a flow chart of an example process for determining an updated location of a UE placing a VoIP-based E911 call according to implementations described herein; and FIG. 11 is a flow chart of another example process for determining an updated location of a UE placing a VoIP-based E911 call according to implementations described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may support emergency calls (e.g., E911 calls) over a network of mixed macro cells and femto cells. In one example implementation, the systems and/or methods may utilize VoIP over a LTE network to support E911 calls, but may also support E911 calls over eHRPD networks or a mixture of LTE and eHRPD networks. The systems and/or methods may determine whether a UE is associated with a femto cell or a macro cell, may determine the UE's (or caller's) initial location, and may determine the UE's (or caller's) updated location.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

As used herein, the terms "caller" and/or "user" may be used interchangeably. Also, the terms "caller" and/or "user" are intended to be broadly interpreted to include a UE or a user of a UE.

Figure 1:
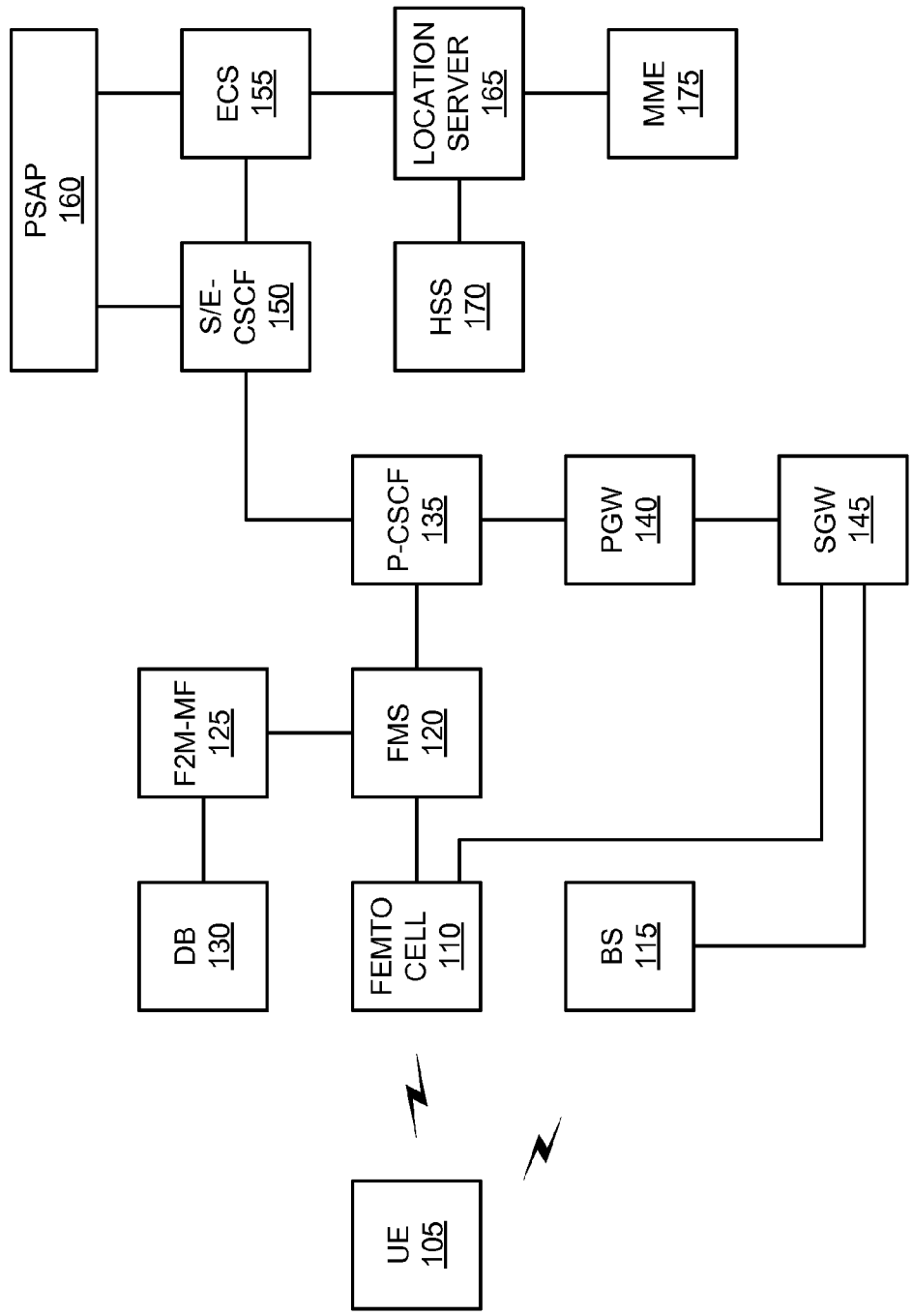
FIG. 1 is a diagram of an example network in which systems and/or methods described herein may be implemented.

FIG. 1 is a diagram of an example network 100 in which systems and/or methods described herein may be implemented. As illustrated, network 100 may include a user equipment (UE) 105, a femto cell 110, a base station (BS) 115, a femto management subsystem (FMS) 120, a femto cell to macro cell mapping function (F2M-MF) 125, a database (DB) 130, a proxy call session control function (P-CSCF) 135, a packet data network (PDN) gateway (PGW) 140, a serving gateway (SGW) 145, a serving or emergency CSCF (S/E-CSCF) 150, an emergency call server (ECS) 155, a PSAP 160, a location server 165, a home subscriber server (HSS) 170, and a mobility management entity (MME) 175.

Components of network 100 may interconnect via wired and/or wireless connections or links. A single UE 105, femto cell 110, BS 115, FMS 120, F2M-MF 125, DB 130, P-CSCF 135, PGW 140, SGW 145, S/E-CSCF 150, ECS 155, PSAP 160, location server 165, HSS 170, and MME 175 have been illustrated in FIG. 1 for simplicity. In practice, there may be more UEs 105, femto cells 110, BSs 115, FMSs 120, F2M-MFs 125, DBs 130, P-CSCFs 135, PGWs 140, SGWs 145, S/E-CSCFs 150, ECSs 155, PSAPs 160, location servers 165, HSSs 170, and/or MMEs 175. Also, in some instances, one or more of the components of network 100 may perform one or more functions described as being performed by another one or more of the components of network 100.

UE 105 may include a radiotelephone, a personal communications system (PCS) terminal (e.g., that may combine a cellular radiotelephone with data processing and data communications capabilities), a wireless telephone, a cellular telephone, a smart phone, a PDA (e.g., that can include a radiotelephone, a pager, Internet/intranet access, etc.), a laptop computer (e.g., with a broadband air card), or other types of mobile communication devices. In an example implementation, UE 105 may include a mobile communication device that is capable of supporting emergency services in a mixed network of macro cells (e.g., LTE-based cells) and femto cells.

Femto cell 110 may include a small cellular base station designed for use in a home or a small business. Femto cell 110 may connect to service provider network via broadband and may support less UEs in a residential setting and more UEs in a business setting. Femto cell 110 may permit service providers to extend service coverage indoors, especially where access would otherwise be limited or unavailable. Femto cell 110 may receive voice and/or data from FMS 120 or SGW 145 and may transmit that voice and/or data to UE 105 via an air interface. Femto cell 110 may also receive voice and/or data from UE 105 over an air interface and may transmit that voice and/or data to FMS 120, SGW 145, or other UEs.

BS 115 may include one or more computation and/or communication devices that may receive voice and/or data from SGW 145 and may transmit that voice and/or data to UE 105 via an air interface. BS 115 may also receive voice and/or data from UE 105 over an air interface and may transmit that voice and/or data to SGW 145 or other UEs.

FMS 120 may include one or more computation and/or communication devices that gather, process, search, and/or provide information in a manner described herein. In an example implementation, FMS 120 may enable auto-configuration of femto cell 110 before UE 105 can access services through femto cell 110.

F2M-MF 125 may include one or more computation and/or communication devices that gather, process, search, and/or provide information in a manner described herein. In an example implementation, F2M-MF 125 may receive, from FMS 120, a request to update a F2M-MF table provided in DB 130, and may update the F2M-MF table based on the request. The F2M-MF table may include a mapping of a femto E-UTRAN (evolved Universal Mobile Telecommunications System (UMTS) Terrestrial Radio Access Network) cell global identifier (or fECGI); a macro ECGI (or mECGI); and a femto GPS (or fGPS identifier). The fECGI may provide an identifier of a femto cell (e.g., femto cell 110) associated with UE 105. The mECGI may provide an identifier of a macro cell (e.g., BS 115) associated with UE 105 and femto cell 110. The fGPS may provide a GPS location of the femto cell associated with UE 105. F2M-MF 125 may receive, from P-CSCF 135, a query for a mECGI and a fGPS of UE 105, corresponding to a fECGI of UE 105, when an E911 call is placed by UE 105; and may provide, to P-CSCF 135, the mECGI and fGPS of UE 105 based on the query. F2M-MF 125 may receive, from location server 165, a query with a fECGI when an ECGI associated with UE 105 is a fECGI; and may provide, to location server 165, a fGPS of UE 105 based on the query.

Database 130 may include one or more storage devices that store information provided by and/or retrieved by F2M-MF 125. In one example implementation, database 130 may store a F2M-MF table that includes a mapping of a fECGI associated with femto cell 110, a mECGI associated with BS 115, and a fGPS associated with femto cell 110.

P-CSCF 135 may include one or more server devices, or other types of computation or communication devices, that gather, process, search, and/or provide information in a manner described herein. In an example implementation, P-CSCF 135 may function as a proxy server for UE 105, where SIP signaling traffic to and from UE 105 may go through P-CSCF 135. P-CSCF 135 may validate and then forward requests from UE 105, and may process and forward responses to UE 105.

PGW 140 may include a traffic transfer device (or network device), such as a gateway, a router, a switch, a firewall, a network interface card (NIC), a hub, a bridge, a proxy server, an optical add-drop multiplexer (OADM), or some other type of device that processes and/or transfers traffic. In an example implementation, PGW 140 may terminate towards a packet data network. PGW 140 may perform policy enforcement, per-user based packet filtering (e.g., by deep packet inspection), charging support, lawful interception, UE 105 IP address allocation, packet screening, etc.

SGW 145 may include a traffic transfer device (or network device), such as a gateway, a router, a switch, a firewall, a NIC, a hub, a bridge, a proxy server, an OADM, or some other type of device that processes and/or transfers traffic. In an example implementation, SGW 145 may control and manage one or more base stations (e.g., femto cell 110 and/or BS 115), and may perform data processing to manage utilization of radio network services. SGW 145 may transmit/receive voice and data to/from femto cell 110, BS 115, other SGWs, and/or PGW 140. SGW 145 may provide a local anchor point for inter-base station handover, and may provide IP routing and forwarding functions.

S/E-CSCF 150 may include one or more server devices, or other types of computation or communication devices, that gather, process, search, and/or provide information in a manner described herein. In an example implementation, S/E-CSCF 150 may be a central node of the signaling plane, and may perform session control. S/E-CSCF 150 may handle SIP registrations, may inspect signaling messages, may decide to which device(s) a SIP message may be forwarded, may provide routing services, etc.

ECS 155 may include one or more server devices, or other types of computation or communication devices, that gather, process, search, and/or provide information in a manner described herein. In an example implementation, ECS 155 may receive, from S/E-CSCF 150 an E911 call via a SIP INVITE that includes a mECGI, a fGPS, and an IP address associated with UE 105; and may use a PSAP routing table (e.g., provided within ECS 155) to determine a PSAP (e.g., PSAP 160) serving the mECGI. ECS 155 may allocate an emergency service routing key (ESRK) and an emergency service routing network (ESRN) to a message based on the determined PSAP; and may provide, to S/E-CSCF 150, the message with the ESRK and ESRN. ECS 155 may receive, from PSAP 160, a query for an initial GPS location of UE 105; and may provide a fGPS associated with UE 105 to PSAP 160 based on the query. ECS 155 may receive, from PSAP 160, a query for an updated GPS location of UE 105; and may provide, to location server 165 and based the updated GPS location query, a query that includes a telephone number, an IP address, and the fGPS associated with UE 105. ECS 155 may receive the updated GPS location of UE 105 from location server 165, and may provide the updated GPS location of UE 105 to PSAP 160.

PSAP 160 may include one or more server devices, or other types of computation or communication devices, that gather, process, search, and/or provide information in a manner described herein. In an example implementation, PSAP 160 may be responsible for answering emergency calls provided via UE 105 (e.g., via femto cell 110 and/or BS 115). PSAP 160 may communicate with emergency personnel (e.g., police, fire, and/or ambulance services) (not shown) to provide information associated with emergency calls.

Location server 165 may include one or more server devices, or other types of computation or communication devices, that gather, process, search, and/or provide information in a manner described herein. In an example implementation, location server 165 may provide a secure user plane location (SUPL) platform (or other similar platforms) that may interact with UE 105 (or network platforms) to obtain a location (e.g., GPS coordinates) associated with UE 105.

HSS 170 may include one or more server devices, or other types of computation or communication devices, that gather, process, search, and/or provide information in a manner described herein. In an example implementation, HSS 170 may include one or more user databases that support network 100 entities that handle calls. The one or more databases of HSS 170 may include subscription-related information (e.g., caller profiles). HSS 170 may perform authentication and authorization of a user, and may provide information about the user's (e.g., UE's 105) location and IP information.

MME 175 may include one or more computation and/or communication devices that may be responsible for idle mode tracking and paging procedures (e.g., including retransmissions) for UE 105. MME 175 may be involved in a bearer activation and deactivation process and may choose a SGW (e.g., SGW 145) for UE 105 at an initial attach and at a time of intra-LTE handover. MME 175 may authenticate UE 105. Non-access stratum (NAS) signaling may terminate at MME 175, and MME 175 may generate and allocate temporary identities to UE 105. MME 175 may check authorization of UE 105 to camp on a service provider's Public Land Mobile Network (PLMN) and may enforce roaming restrictions for UE 105. MME 175 may provide a control plane function for mobility between LTE and access networks.

Although FIG. 1 shows example components of network 100, in other implementations, network 100 may contain fewer components, different components, differently arranged components, or additional components than depicted in FIG. 1.

Figure 2:
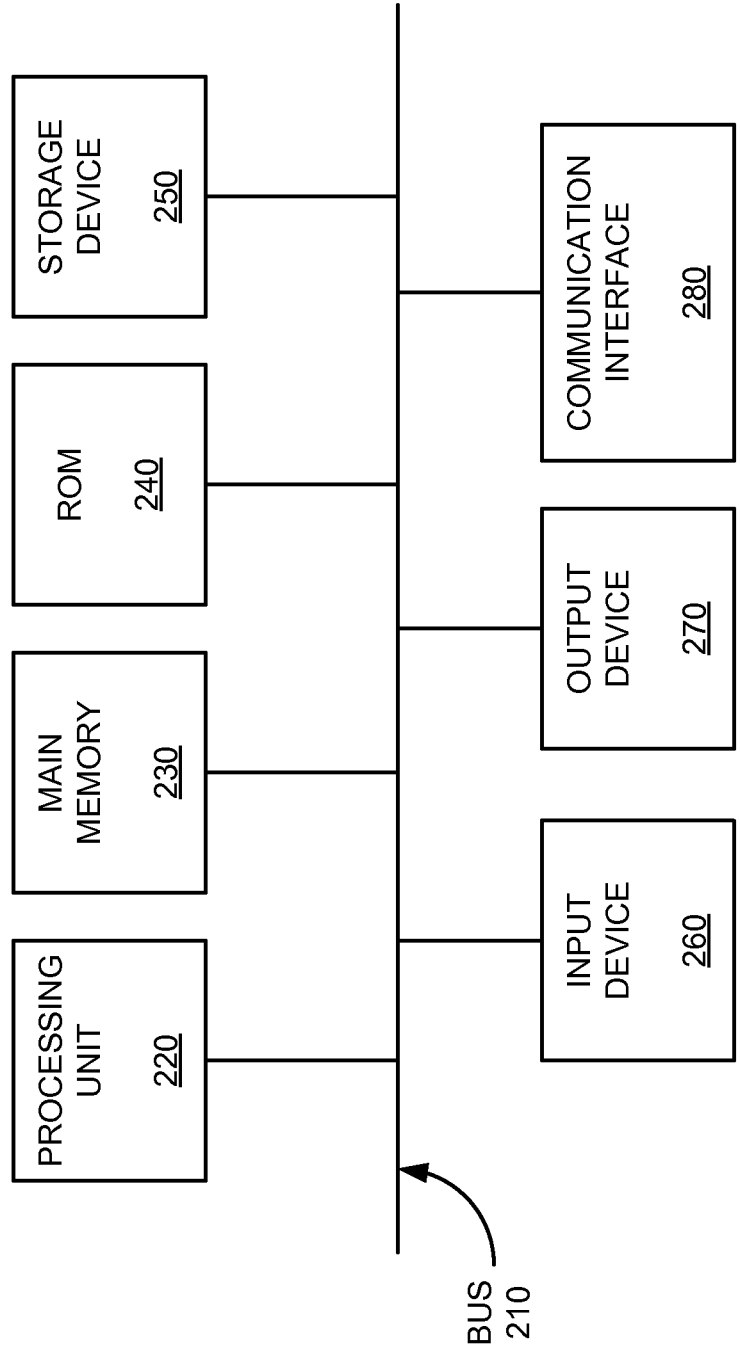
FIG. 2 is a diagram of example components of one or more devices of the network illustrated in FIG. 1.

FIG. 2 is a diagram of example components of a device 200 that may correspond to one or more devices of network 100. As illustrated, device 200 may include a bus 210, a processing unit 220, a main memory 230, a ROM 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a RAM or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
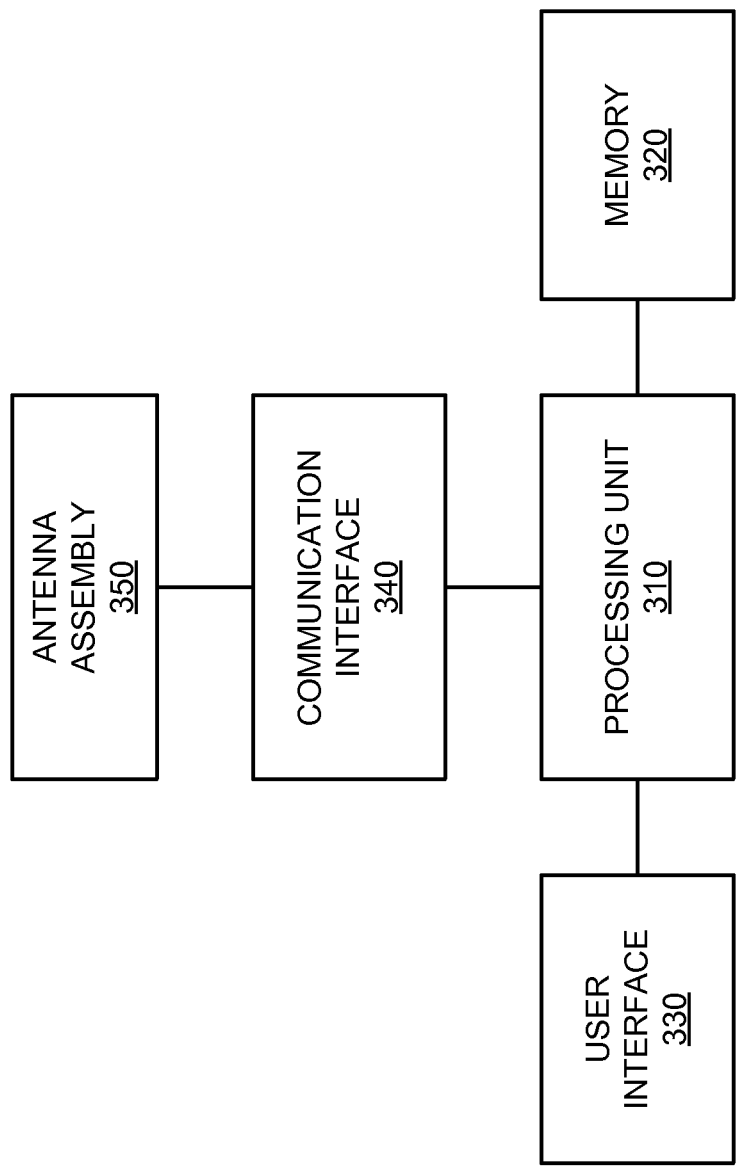
FIG. 3 is a diagram of example components of a user equipment of the network depicted in FIG. 1.

FIG. 3 depicts a diagram of example components of a device 300 that may correspond to, for example, UE 105. As illustrated, device 300 may include a processing unit 310, memory 320, a user interface 330, a communication interface 340, and/or an antenna assembly 350.

Processing unit 310 may include one or more processors, microprocessors, ASICs, FPGAs, or the like. Processing unit 310 may control operation of device 300 and its components. In one implementation, processing unit 310 may control operation of components of device 300 in a manner described herein.

Memory 320 may include a RAM, a ROM, and/or another type of memory to store data and instructions that may be used by processing unit 310.

User interface 330 may include mechanisms for inputting information to device 300 and/or for outputting information from device 300. Examples of input and output mechanisms might include buttons (e.g., control buttons, keys of a keypad, a joystick, etc.) or a touch screen interface to permit data and control commands to be input into device 300; a speaker to receive electrical signals and output audio signals; a microphone to receive audio signals and output electrical signals; a display to output visual information (e.g., text input into device 300); and/or a vibrator to causer equipment 300 to vibrate.

Communication interface 340 may include, for example, a transmitter that may convert baseband signals from processing unit 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and/or reception of the RF signals.

Antenna assembly 350 may include one or more antennas to transmit and/or receive RF signals over the air. Antenna assembly 350 may, for example, receive RF signals from communication interface 340 and transmit them over the air, and receive RF signals over the air and provide them to communication interface 340. In one implementation, for example, communication interface 340 may communicate with a network and/or devices connected to a network.

As will be described in detail below, device 300 may perform certain operations described herein in response to processing unit 310 executing software instructions of an application contained in a computer-readable medium, such as memory 320. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
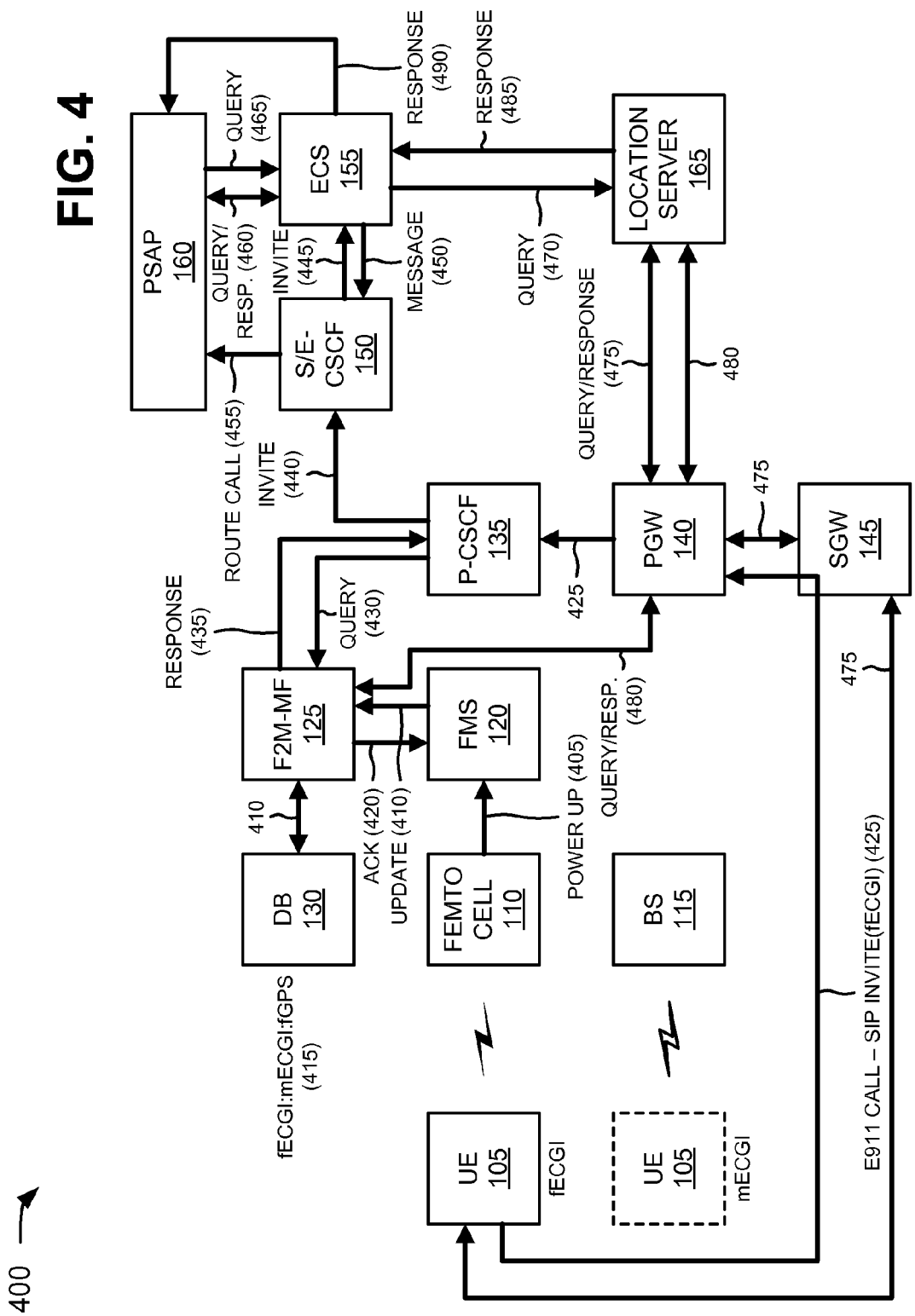
FIG. 4 is a diagram of example operations capable of being performed by an example portion of the network illustrated in FIG. 1.

FIG. 4 is a diagram of example operations capable of being performed by an example portion 400 of network 100. As shown in FIG. 4, network portion 400 may include UE 105, femto cell 110, BS 115, FMS 120, F2M-MF 125, DB 130, P-CSCF 135, PGW 140, SGW 145, S/E-CSCF 150, ECS 155, PSAP 160, and location server 165. UE 105, femto cell 110, BS 115, FMS 120, F2M-MF 125, DB 130, P-CSCF 135, PGW 140, SGW 145, S/E-CSCF 150, ECS 155, PSAP 160, and/or location server 165 may include the features described above in connection with one or more of, for example, FIGS. 1-3.

As further shown in FIG. 4, when UE 105 is connected to femto cell 110, UE 105 may be associated with a fECGI of femto cell 110. When UE 105 is connected to BS 115, UE 105 may be associated with a mECGI of BS 115. When femto cell 110 initiates or powers up, femto cell 110 may provide a power up signal 405 to FMS 120. FMS 120 may receive power up signal 405, and may provide an update request 410 to F2M-MF 125 based on power up signal 405. Update request 410 may request F2M-MF 125 to update the F2M-MF table contained in DB 130. F2M-MF 125 may provide update request 410 to DB 130, and DB 130 may update the F2M-MF table. For example, based on update request 410, DB 130 may update the mapping of the fECGI associated with femto cell 110, the mECGI associated with BS 115, and the fGPS associated with femto cell 110, as indicated by reference number 415. Once the update of the F2M-MF table is complete, F2M-MF 125 may provide an acknowledgment (ACK) message 420 to FMS 120, acknowledging completion of the update.

If UE 105 makes an E911 call while connected to femto cell 110, UE 105 may generate a SIP INVITE 425 (e.g., for the E911 call) that includes the fECGI, and may provide SIP INVITE 425 to PGW 140 via SGW 145. PGW 140 may provide SIP INVITE 425 to P-CSCF 135, and P-CSCF 135 may recognize the E911 call based on SIP INVITE 425. P-CSCF 135 may read the fECGI of SIP INVITE 425, or may determine the fECGI from femto cell 110 via a variety of methods (e.g., by checking the ECGI range). P-CSCF 135 may provide a query 430 to F2M-MF 125 based on the fECGI. Query 430 may request a mECGI and a fGPS corresponding to the fECGI of SIP INVITE 425. F2M-MF 125 may receive query 430, may determine the requested mECGI and fGPS in DB 130, and may generate a response 435 that includes the mECGI and fGPS corresponding to the fECGI of SIP INVITE 425. F2M-MF 125 may provide response 435 to P-CSCF 135. If the call is an E911 call, P-CSCF 135 may replace fECGI in SIP INVITE 425 with the mECGI (e.g., of response 435), may add the fGPS (e.g., of response 435) to a header of SIP INVITE 425, and may add a femto indicator (e.g., identifying femto cell 110) to SIP INVITE 425 to produce a modified SIP INVITE 440. P-CSCF 135 may provide modified SIP INVITE 440 (e.g., with the femto indicator, the mECGI, and the fGPS) to S/E-CSCF 150.

S/E/-CSCF 150 may extract an IP address of UE 105 from a contact header in SIP INVITE 440, and may add the IP address of UE 105 to a private header in SIP INVITE 440 (e.g., to create SIP INVITE 445). S/E-CSCF 150 may provide SIP INVITE 445 to ECS 155. ECS 155 may use a PSAP routing table (e.g., provided in ECS 155) to determine a PSAP (e.g., PSAP 160) serving BS 115 associated with the mECGI (e.g., provided in SIP INVITE 445). Once the PSAP is determined, ECS 155 may allocate an ESRK and an ESRN (e.g., based on the determined PSAP) for S/E-CSCF 150 to use to route the E911 call to PSAP 160. The ESRK may also be used as a reference key by PSAP 160 to query ECS 155 for a GPS location of UE 105. ECS 155 may provide the ESRK and the ESRN in a message 450 (e.g., a SIP "300" multiple choice message), and may provide message 450 to S/E-CSCF 150.

S/E-CSCF 150 may receive message 450, and may route the E911 call to PSAP 160 based on the ESRK and the ESRN provided in message 450, as indicated by reference number 455. Upon receiving the E911 call, PSAP 160 may query ECS 155 for an initial GPS location of UE 105, as indicated by reference number 460. ECS 155 may respond to query 460 with a response 460 that includes the GPS location of femto cell 110 (e.g., the fGPS) received from S/E-CSCF 150 via SIP INVITE 445. PSAP 160 may then provide, to ECS 155, a query 465 for an updated GPS location of UE 105. Upon receiving query 465 for the updated GPS location of UE 105, ECS 155 may provide, to location server 165, a query 470 that includes a femto indicator, a telephone number (TN) of UE 105, and an IP address of UE 105.

Location server 165 may receive query 470, and may begin a location session (e.g., based on query 470) using, for example, a location positioning protocol (LPP) session over the secure user plane location (SUPL) platform (or other similar platforms). From the LPP session, location server 165 may provide, to PGW 140, a query 475 that includes the IP address of UE 105. PGW 140 may provide query 475 to SGW 145, and SGW 145 may provide query 475 to UE 105. UE 105 may return a response 475 that includes an ECGI (e.g., fECGI or mECGI) of the current cell associated with UE 105 (e.g., in case UE 105 switched from femto cell 110 to BS 115, or vice versa, after placing the E911 call). For example, response 475 may include the fECGI if UE 105 is connected to femto cell 110, or response 475 may include the mECGI if UE is connected to BS 115. Location server 165 may determine whether UE 105 is connected to femto cell 110 or BS 115

(e.g., whether the ECGI is a fECGI or a mECGI) based on the ECGI returned with response 475. For example, location server 165 may make this determination by inspecting the ECGI range or another signature.

If location server 165 determines that the ECGI returned with response 475 is a mECGI (i.e., UE 105 is connected to BS 115), location server 165 may continue the LPP session over the SUPL platform to obtain the updated GPS location of UE 105. If location server 165 determines that the ECGI returned with response 475 is a fECGI (i.e., UE 105 is connected to femto cell 110), location server 165 may generate a query 480 that includes the fECGI and may provide query 480 to F2M-MF 125 (e.g., via PGW 140). F2M-MF 125 may receive query 480 and may determine the GPS location of femto cell 110 (e.g., the fGPS) based on the fECGI provided in query 480. F2M-MF 125 may provide, to location server 165 (e.g., via PGW 140), a response 480 that includes the fGPS. Location server 165 may receive response 480 and may utilize the GPS location of femto cell 110 (e.g., the fGPS) to approximate the updated GPS location of UE 105. Location server 165 may provide, to ECS 155 (e.g., in response to query 470), a response 485 that includes the updated GPS location of UE 105. ECS 155 may provide, to PSAP 160 (e.g., in response to query 465), a response 490 that includes the updated GPS location of UE 105.

Although FIG. 4 shows example components of network portion 400, in other implementations, network portion 400 may include fewer components, different components, differently arranged components, or additional components than depicted in FIG. 4. Alternatively, or additionally, one or more components of network portion 400 may perform one or more other tasks described as being performed by one or more other components of network portion 400.

Figure 5:
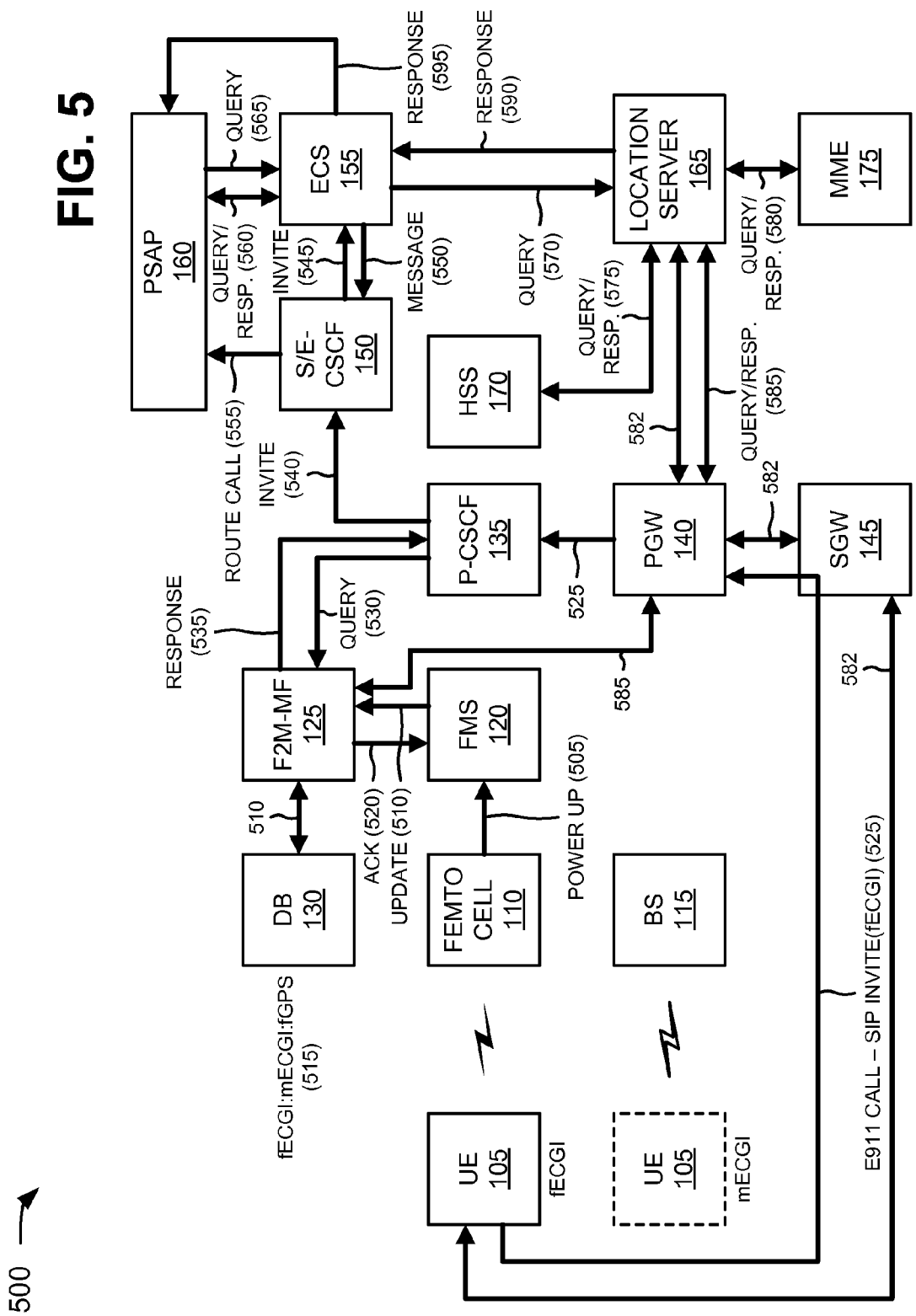
FIG. 5 is a diagram of example operations capable of being performed by another example portion of the network illustrated in FIG. 1.

FIG. 5 is a diagram of example operations capable of being performed by another example portion 500 of network 100. As shown in FIG. 5, network portion 500 may include UE 105, femto cell 110, BS 115, FMS 120, F2M-MF 125, DB 130, P-CSCF 135, PGW 140, SGW 145, S/E-CSCF 150, ECS 155, PSAP 160, location server 165, HSS 170, and MME 175. UE 105, femto cell 110, BS 115, FMS 120, F2M-MF 125, DB 130, P-CSCF 135, PGW 140, SGW 145, S/E-CSCF 150, ECS 155, PSAP 160, location server 165, HSS 170, and/or MME 175 may include the features described above in connection with one or more of, for example, FIGS. 1-4.

As further shown in FIG. 5, when UE 105 is connected to femto cell 110, UE 105 may be associated with a fECGI of femto cell 110. When UE 105 is connected to BS 115, UE 105 may be associated with a mECGI of BS 115. When femto cell 110 initiates or powers up, femto cell 110 may provide a power up signal 505 to FMS 120. FMS 120 may receive power up signal 505, and may provide an update request 510 to F2M-MF 125 based on power up signal 505. Update request 510 may request F2M-MF 125 to update the F2M-MF table contained in DB 130. F2M-MF 125 may provide update request 510 to DB 130, and DB 130 may update the F2M-MF table. For example, based on update request 510, DB 130 may update the mapping of the fECGI associated with femto cell 110, the mECGI associated with BS 115, and the fGPS associated with femto cell 110, as indicated by reference number 515. Once the update of the F2M-MF table is complete, F2M-MF 125 may provide an acknowledgment (ACK) message 520 to FMS 120, acknowledging completion of the update.

If UE 105 makes an E911 call while connected to femto cell 110, UE 105 may generate a SIP INVITE 525 (e.g., for the E911 call) that includes the fECGI, and may provide SIP INVITE 525 to PGW 140 via SGW 145. PGW 140 may provide SIP INVITE 525 to P-CSCF 135, and P-CSCF 135 may recognize the E911 call based on SIP INVITE 525. P-CSCF 135 may read the fECGI of SIP INVITE 525, or may determine the fECGI from femto cell 110 via a variety of methods (e.g., by checking the ECGI range). P-CSCF 135 may provide a query 530 to F2M-MF 125 based on the fECGI. Query 530 may request a mECGI and a fGPS corresponding to the fECGI of SIP INVITE 525. F2M-MF 125 may receive query 530, may determine the requested mECGI and fGPS in DB 130, and may generate a response 535 that includes the mECGI and fGPS corresponding to the fECGI of SIP INVITE 525. F2M-MF 125 may provide response 535 to P-CSCF 135. If the call is an E911 call, P-CSCF 135 may replace fECGI in SIP INVITE 525 with the mECGI (e.g., of response 535), may add the fGPS (e.g., of response 535) to a header of SIP INVITE 525, and may add a femto indicator (e.g., identifying femto cell 110) to SIP INVITE 525 to produce a modified SIP INVITE 540. P-CSCF 135 may provide modified SIP INVITE 540 (e.g., with the femto indicator, the mECGI, and the fGPS) to S/E-CSCF 150.

S/E/-CSCF 150 may extract an IP address of UE 105 from a contact header in SIP INVITE 540, and may add the IP address of UE 105 to a private header in SIP INVITE 540 (e.g., to create SIP INVITE 545). S/E-CSCF 150 may provide SIP INVITE 545 to ECS 155. ECS 155 may use a PSAP routing table (e.g., provided in ECS 155) to determine a PSAP (e.g., PSAP 160) serving BS 115 associated with the mECGI (e.g., provided in SIP INVITE 545). Once the PSAP is determined, ECS 155 may allocate an ESRK and an ESRN (e.g., based on the determined PSAP) for S/E-CSCF 150 to use to route the E911 call to PSAP 160. The ESRK may also be used as a reference key by PSAP 160 to query ECS 155 for a GPS location of UE 105. ECS 155 may provide the ESRK and the ESRN in a message 550 (e.g., a SIP "300" multiple choice message), and may provide message 550 to S/E-CSCF 150.

S/E-CSCF 150 may receive message 550, and may route the E911 call to PSAP 160 based on the ESRK and the ESRN provided in message 550, as indicated by reference number 555. Upon receiving the E911 call, PSAP 160 may query ECS 155 for an initial GPS location of UE 105, as indicated by reference number 560. ECS 155 may respond to query 560 with a response 560 that includes the GPS location of femto cell 110 (e.g., the fGPS) received from S/E-CSCF 150 via SIP INVITE 545. PSAP 160 may then provide, to ECS 155, a query 565 for an updated GPS location of UE 105. Upon receiving query 565 for the updated GPS location of UE 105, ECS 155 may provide, to location server 165, a query 570 that includes a femto indicator, a telephone number (TN) of UE 105, and an IP address of UE 105.

Location server 165 may receive query 570, and may generate query 575 (e.g., using the TN of UE 105) to determine a serving MME (e.g., MME 175) associated with UE 105. Location server 165 may provide query 575 to HSS 170, and HSS 170 may provide a response 575 (e.g., that includes an identifier for MME 175 and an International Mobile Subscriber Identity (IMSI) of UE 105) to location server 165. Location server 165 may provide a query 580 (e.g., that includes the IMSI of UE 105) to MME 175 in order to determine an ECGI of the current cell associated with UE 105. MME 175 may provide, to location server 165 (e.g., in response to query 580), a response 580 that includes the ECGI (e.g., fECGI or mECGI) of the current cell associated with UE 105 (e.g., in case UE 105 switched from femto cell 110 to BS 115, or vice versa, after placing the E911 call). For example, response 580 may include the fECGI if UE 105 is connected to femto cell 110, or response 580 may include the mECGI if UE is connected to BS 115. Location server 165 may determine whether UE 105 is connected to femto cell 110 or BS 115 (e.g., whether the ECGI is a fECGI or a mECGI) based on the ECGI returned with response 580. For example, location server 165 may make this determination by inspecting the ECGI range or another signature.

If location server 165 determines that the ECGI returned with response 580 is a mECGI (i.e., UE 105 is connected to BS 115), location server 165 may use a macro method to obtain the updated GPS location of UE 105. For example, location server 165 may initiate a LPP session over a SUPL platform to obtain the updated GPS location of UE 105. The LPP session over the SUPL platform may enable location server 165 to communicate with UE 105 via PGW 140 and SGW 145, as indicated by reference number 582. If location server 165 determines that the ECGI returned with response 580 is a fECGI (i.e., UE 105 is connected to femto cell 110), location server 165 may generate a query 585 that includes the fECGI and may provide query 585 to F2M-MF 125 (e.g., via PGW 140). F2M-MF 125 may receive query 585 and may determine the GPS location of femto cell 110 (e.g., the fGPS) based on the fECGI provided in query 585. F2M-MF 125 may provide, to location server 165 (e.g., via PGW 140), a response 585 that includes the fGPS. Location server 165 may receive response 585 and may utilize the GPS location of femto cell 110 (e.g., the fGPS) to approximate the updated GPS location of UE 105. Location server 165 may provide, to ECS 155 (e.g., in response to query 570), a response 590 that includes the updated GPS location of UE 105. ECS 155 may provide, to PSAP 160 (e.g., in response to query 565), a response 595 that includes the updated GPS location of UE 105.

Although FIG. 5 shows example components of network portion 500, in other implementations, network portion 500 may include fewer components, different components, differently arranged components, or additional components than depicted in FIG. 5. Alternatively, or additionally, one or more components of network portion 500 may perform one or more other tasks described as being performed by one or more other components of network portion 500.

The operations described in connection with FIGS. 4 and 5 may be similar in many respects. However, FIG. 4 may depict a UE-based approach to providing emergency support for VoIP since the ECGI of the current cell associated with UE 105 may be obtained directly from UE 105 (e.g., via response 475). Whereas FIG. 5 may depict a network-based approach to providing emergency support for VoIP since the ECGI of the current cell associated with UE 105 may be obtained from MME 175 (e.g., via response 580).

FIG. 6 is a flow chart of an example process 600 for determining a location of a UE placing a VoIP-based E911 call according to implementations described herein. In one implementation, process 600 may be performed by F2M-MF 125. In another implementation, some or all of process 600 may be performed by another device or group of devices, including or excluding F2M-MF 125.

As shown in FIG. 6, process 600 may include receiving, from a FMS, a request to update a F2M-MF table (block 610), and updating the F2M-MF table based on the request (block 620). For example, in implementations described above in connection with FIG. 4, FMS 120 may receive power up signal 405, and may provide update request 410 to F2M-MF 125 based on power up signal 405. Update request 410 may request F2M-MF 125 to update the F2M-MF table contained in DB 130. F2M-MF 125 may provide update request 410 to DB 130, and DB 130 may update the F2M-MF table. For example, based on update request 410, DB 130 may update the mapping of the fECGI associated with femto cell 110, the mECGI associated with BS 115, and the fGPS associated with femto cell 110, as indicated by reference number 415.

As further shown in FIG. 6, process 600 may include receiving, from a P-CSCF, a query for a mECGI and a fGPS associated with a UE, corresponding to a fECGI, when an E911 call is placed by the UE (block 630), and providing, to the P-CSCF, the mECGI and the fGPS associated with the UE based on the query from the P-CSCF (block 640). For example, in implementations described above in connection with FIG. 4, if UE 105 makes an E911 call while connected to femto cell 110, UE 105 may generate SIP INVITE 425 (e.g., for the E911 call) that includes the fECGI, and may provide SIP INVITE 425 to PGW 140. PGW 140 may provide SIP INVITE 425 to P-CSCF 135, and P-CSCF 135 may recognize the E911 call based on SIP INVITE 425. P-CSCF 135 may provide query 430 to F2M-MF 125 based on the fECGI. Query 430 may request a mECGI and a fGPS corresponding to the fECGI of SIP INVITE 425. F2M-MF 125 may receive query 430, may determine the requested mECGI and fGPS in DB 130, and may generate response 435 that includes the mECGI and fGPS corresponding to the fECGI of SIP INVITE 425. F2M-MF 125 may provide response 435 to P-CSCF 135.

Returning to FIG. 6, process 600 may include receiving, from a location server, a query with a fECGI when an ECGI associated with the UE is a fECGI (block 650), and providing, to the location server, a fGPS of the UE based on the query, where the location server uses the fGPS to approximate a location of the UE (block 660). For example, in implementations described above in connection with FIG. 4, if location server 165 determines that the ECGI returned with response 475 is a fECGI (i.e., UE 105 is connected to femto cell 110), location server 165 may generate query 480 that includes the fECGI and may provide query 480 to F2M-MF 125 (e.g., via PGW 140). F2M-MF 125 may receive query 480 and may determine the GPS location of femto cell 110 (e.g., the fGPS) based on the fECGI provided in query 480. F2M-MF 125 may provide, to location server 165 (e.g., via PGW 140), response 480 that includes the fGPS. Location server 165 may receive response 480 and may utilize the GPS location of femto cell 110 (e.g., the fGPS) to approximate the updated GPS location of UE 105.

FIG. 7 is a flow chart of an example process for modifying a SIP INVITE associated with an E911 call according to implementations described herein. In one implementation, process 700 may be performed by P-CSCF 135. In another implementation, some or all of process 700 may be performed by another device or group of devices, including or excluding P-CSCF 135.

As shown in FIG. 7, process 700 may include receiving, from a UE, an E911 call via a SIP INVITE that includes a fECGI associated with the UE (block 710), and providing, to a F2M-MF, a query for a mECGI and a fGPS, of the UE, corresponding to the fECGI (block 720). For example, in implementations described above in connection with FIG. 4, if UE 105 makes an E911 call while connected to femto cell 110, UE 105 may generate SIP INVITE 425 (e.g., for the E911 call) that includes the fECGI, and may provide SIP INVITE 425 to PGW 140. PGW 140 may provide SIP INVITE 425 to P-CSCF 135, and P-CSCF 135 may recognize the E911 call based on SIP INVITE 425. P-CSCF 135 may read the fECGI of SIP INVITE 425, or may determine the fECGI from femto cell 110 via a variety of methods (e.g., by checking the ECGI range). P-CSCF 135 may provide query 430 to F2M-MF 125 based on the fECGI. Query 430 may request a mECGI and a fGPS corresponding to the fECGI of SIP INVITE 425.

As further shown in FIG. 7, process 700 may include receiving, from the F2M-MF and based on the query, the mECGI and the fGPS associated with the UE (block 730), replacing the fECGI with the mECGI and the fGPS in the SIP INVITE to create a modified SIP INVITE (block 740), and providing the modified SIP INVITE of the E911 call to a S/E-CSCF for further processing (block 750). For example, in implementations described above in connection with FIG. 4, F2M-MF 125 may receive query 430, may determine the requested mECGI and fGPS in DB 130, and may generate response 435 that includes the mECGI and fGPS corresponding to the fECGI of SIP INVITE 425. F2M-MF 125 may provide response 435 to P-CSCF 135. If the call is an E911 call, P-CSCF 135 may replace fECGI in SIP INVITE 425 with the mECGI (e.g., of response 435), may add the fGPS (e.g., of response 435) to a header of SIP INVITE 425, and may add a femto indicator (e.g., identifying femto cell 110) to SIP INVITE 425 to produce modified SIP INVITE 440. P-CSCF 135 may provide modified SIP INVITE 440 (e.g., with the femto indicator, the mECGI, and the fGPS) to S/E-CSCF 150.

FIG. 8 is a flow chart of an example process 800 for determining a correct PSAP for a VoIP-based E911 call according to implementations described herein. In one implementation, process 800 may be performed by S/E-CSCF 150. In another implementation, some or all of process 800 may be performed by another device or group of devices, including or excluding S/E-CSCF 150.

As shown in FIG. 8, process 800 may include receiving, from a P-CSCF, an E911 call via a SIP INVITE that includes a mECGI and a fGPS associated with a UE (block 810), adding an IP address of the UE to the SIP INVITE to produce a modified SIP INVITE (block 820), and providing the modified SIP INVITE to an ECS (block 830). For example, in implementations described above in connection with FIG. 4, if the call is an E911 call, P-CSCF 135 may replace fECGI in SIP INVITE 425 with the mECGI (e.g., of response 435), may add the fGPS (e.g., of response 435) to a header of SIP INVITE 425, and may add a femto indicator (e.g., identifying femto cell 110) to SIP INVITE 425 to produce SIP INVITE 440. P-CSCF 135 may provide SIP INVITE 440 (e.g., with the femto indicator, the mECGI, and the fGPS) to S/E-CSCF 150. S/E/-CSCF 150 may extract an IP address of UE 105 from a contact header in SIP INVITE 440, and may add the IP address of UE 105 to a private header in SIP INVITE 440 (e.g., to create SIP INVITE 445). S/E-CSCF 150 may provide SIP INVITE 445 to ECS 155.

As further shown in FIG. 8, process 800 may include receiving, from the ECS, a multiple choice message with an ESRK and an ESRN based on the modified SIP INVITE (block 840), and routing the E911 call to a PSAP based on the ESRK and the ESRN (block 850). For example, in implementations described above in connection with FIG. 4, ECS 155 may use a PSAP routing table (e.g., provided in ECS 155) to determine a PSAP (e.g., PSAP 160) serving BS 115 associated with the mECGI (e.g., provided in SIP INVITE 445). Once the PSAP is determined, ECS 155 may allocate an ESRK and an ESRN (e.g., based on the determined PSAP) for S/E-CSCF 150 to use to route the E911 call to PSAP 160. The ESRK may also be used as a reference key by PSAP 160 to query ECS 155 for a GPS location of UE 105. ECS 155 may provide the ESRK and the ESRN in message 450 (e.g., a SIP "300" multiple choice message), and may provide message 450 to S/E-CSCF 150. S/E-CSCF 150 may receive message 450, and may route the E911 call to PSAP 160 based on the ESRK and ESRN provided in message 450, as indicated by reference number 455.

FIG. 9 is a flow chart of an example process 900 for determining initial and updated locations of a UE placing a VoIP-based E911 call according to implementations described herein. In one implementation, process 900 may be performed by ECS 155. In another implementation, some or all of process 900 may be performed by another device or group of devices, including or excluding ECS 155.

As shown in FIG. 9, process 900 may include receiving, from a S/E-CSCF, an E911 call via a SIP INVITE that includes a mECGI and a fGPS associated with a UE (block 905), using a PSAP routing table to determine a PSAP serving the mECGI (block 910), and allocating an ESRK and an ESRN to a multiple choice message based on the determined PSAP (block 915). For example, in implementations described above in connection with FIG. 4, S/E/-CSCF 150 may extract an IP address of UE 105 from a contact header in SIP INVITE 440, and may add the IP address of UE 105 to a private header in SIP INVITE 440 (e.g., to create SIP INVITE 445). S/E-CSCF 150 may provide SIP INVITE 445 to ECS 155. ECS 155 may use a PSAP routing table (e.g., provided in ECS 155) to determine a PSAP (e.g., PSAP 160) serving BS 115 associated with the mECGI (e.g., provided in SIP INVITE 445). Once the PSAP is determined, ECS 155 may allocate an ESRK and an ESRN (e.g., based on the determined PSAP) for S/E-CSCF 150 to use to route the E911 call to PSAP 160. The ESRK may also be used as a reference key by PSAP 160 to query ECS 155 for a GPS location of UE 105. ECS 155 may provide the ESRK and the ESRN in message 450 (e.g., a SIP "300" multiple choice message).

As further shown in FIG. 9, process 900 may include providing, to the S/E-CSCF, the multiple choice message with the ESRK and ESRN (block 920), receiving, from the determined PSAP, a query for an initial GPS location of the UE (block 925), and providing a fGPS of the UE to the PSAP based on the query (block 930). For example, in implementations described above in connection with FIG. 4, ECS 155 may provide message 450 to S/E-CSCF 150. S/E-CSCF 150 may receive message 450, and may route the E911 call to PSAP 160 based on the ESRK and the ESRN provided in message 450, as indicated by reference number 455. Upon receiving the E911 call, PSAP 160 may query ECS 155 for an initial GPS location of UE 105, as indicated by reference number 460. ECS 155 may respond to query 460 with response 460 that includes the GPS location of femto cell 110 (e.g., the fGPS) received from S/E-CSCF 150 via SIP INVITE 445.

Returning to FIG. 9, process 900 may include receiving, from the PSAP, a query for an updated GPS location of the UE (block 935), providing, to a location server, a query, with a telephone number (TN), IP address, and fGPS associated with the UE, based on the updated location query (block 940), receiving the updated GPS location of the UE from the location server (block 945), and providing the updated GPS location of the UE to the PSAP (block 950). For example, in implementations described above in connection with FIG. 4, PSAP 160 may provide, to ECS 155, query 465 for an updated GPS location of UE 105. Upon receiving query 465 for the updated GPS location of UE 105, ECS 155 may provide, to location server 165, query 470 that includes a femto indicator, a telephone number (TN) of UE 105, and an IP address of UE 105. Location server 165 may receive query 470, and may determine the updated GPS location of UE 105 based on query 470. Location server 165 may provide, to ECS 155 (e.g., in response to query 470), response 485 that includes the updated GPS location of UE 105. ECS 155 may provide, to PSAP 160 (e.g., in response to query 465), response 490 that includes the updated GPS location of UE 105.

FIG. 10 is a flow chart of an example process 1000 for determining an updated location of a UE placing a VoIP-based E911 call according to implementations described herein. In one implementation, process 1000 may be performed by location server 165. In another implementation, some or all of process 1000 may be performed by another device or group of devices, including or excluding location server 165.

As shown in FIG. 10, process 1000 may include receiving, from an ECS, a query with a telephone number (TN), IP address, and fGPS of a UE placing an E911 call (block 1010), obtaining a serving cell ECGI of the UE based on the query and using LPP over SUPL (block 1020), and determining whether the ECGI of the UE is a macro ECGI or a femto ECGI (block 1030). For example, in implementations described above in connection with FIG. 4, location server 165 may receive query 470 that includes a femto indicator, a TN of UE 105, and an IP address of UE 105, and may begin a location session (e.g., based on query 470) using, for example, a LPP session over the SUPL platform (or other similar platforms). From the LPP session, location server 165 may provide, to PGW 140, query 475 that includes the IP address of UE 105. PGW 140 may provide query 475 to SGW 145, and SGW 145 may provide query 475 to UE 105. UE 105 may return response 475 that includes an ECGI (e.g., fECGI or mECGI) of the current cell associated with UE 105 (e.g., in case UE 105 switched from femto cell 110 to BS 115, or vice versa, after placing the E911 call). Location server 165 may determine whether UE 105 is connected to femto cell 110 or BS 115 (e.g., whether the ECGI is a fECGI or a mECGI) based on the ECGI returned with response 475.

As further shown in FIG. 10, if the ECGI of the UE is a mECGI (block 1030—mECGI), process 1000 may include continuing the SUPL session to obtain, from the UE, a GPS location of the UE (block 1040). If the ECGI of the UE is a fECGI (block 1030—fECGI), process 1000 may include providing, to a F2M-MF, a query, with the fECGI, to determine a fGPS of the UE (block 1050), and using the fGPS to approximate the GPS location of the UE (block 1060). For example, in implementations described above in connection with FIG. 4, if location server 165 determines that the ECGI returned with response 475 is a mECGI (i.e., UE 105 is connected to BS 115), location server 165 may continue the LPP session over the SUPL platform to obtain the updated GPS location of UE 105. If location server 165 determines that the ECGI returned with response 475 is a fECGI (i.e., UE 105 is connected to femto cell 110), location server 165 may generate query 480 that includes the fECGI and may provide query 480 to F2M-MF 125 (e.g., via PGW 140). F2M-MF 125 may receive query 480 and may determine the GPS location of femto cell 110 (e.g., the fGPS) based on the fECGI provided in query 480. F2M-MF 125 may provide, to location server 165 (e.g., via PGW 140), response 480 that includes the fGPS. Location server 165 may receive response 480 and may utilize the GPS location of femto cell 110 (e.g., the fGPS) to approximate the updated GPS location of UE 105.

Returning to FIG. 10, process 1000 may include providing the GPS location of the UE to the ECS in response to the query received from the ECS (block 1070). For example, in implementations described above in connection with FIG. 4, location server 165 may provide, to ECS 155 (e.g., in response to query 470), response 485 that includes the updated GPS location of UE 105. ECS 155 may provide, to PSAP 160 (e.g., in response to query 465), response 490 that includes the updated GPS location of UE 105.

FIG. 11 is a flow chart of another example process 1100 for determining an updated location of a UE placing a VoIP-based E911 call according to implementations described herein. In one implementation, process 1100 may be performed by location server 165. In another implementation, some or all of process 1100 may be performed by another device or group of devices, including or excluding location server 165.

As shown in FIG. 11, process 1100 may include receiving, from an ECS, a query with a telephone number (TN), IP address, and fGPS of a UE placing an E911 call (block 1110), and providing, to a HSS, a query with the TN to determine a serving MME (block 1120). For example, in implementations described above in connection with FIG. 5, location server 165 may receive query 570 that includes a femto indicator, a TN of UE 105, and an IP address of UE 105, and may generate query 575 (e.g., using the TN of UE 105) to determine a serving MME (e.g., MME 175) associated with UE 105. Location server 165 may provide query 575 to HSS 170, and HSS 170 may provide response 575 (e.g., that includes an identifier for MME 175 and an IMSI of UE 105) to location server 165.

As further shown in FIG. 11, process 1100 may include providing, to the serving MME, a query to determine a serving cell ECGI of the UE (block 1130), and determining whether the ECGI of the UE is a macro ECGI or a femto ECGI (block 1140). For example, in implementations described above in connection with FIG. 5, location server 165 may provide query 580 (e.g., that includes the IMSI of UE 105) to MME 175 in order to determine an ECGI of the current cell associated with UE 105. MME 175 may provide, to location server 165 (e.g., in response to query 580), response 580 that includes the ECGI (e.g., fECGI or mECGI) of the current cell associated with UE 105 (e.g., in case UE 105 switched from femto cell 110 to BS 115, or vice versa, after placing the E911 call). For example, response 580 may include the fECGI if UE 105 is connected to femto cell 110, or response 580 may include the mECGI if UE is connected to BS 115. Location server 165 may determine whether UE 105 is connected to femto cell 110 or BS 115 (e.g., whether the ECGI is a fECGI or a mECGI) based on the ECGI returned with response 580.

Returning to FIG. 11, if the ECGI of the UE is a mECGI (block 1140-mECGI), process 1100 may include initiating a SUPL session to obtain a GPS location of the UE (block 1150). If the ECGI of the UE is a fECGI (block 1140—fECGI), process 1100 may include providing, to a F2M-MF, a query, with the fECGI, to determine a fGPS of the UE (block 1160), and using the fGPS to approximate the GPS location of the UE (block 1170). For example, in implementations described above in connection with FIG. 5, if location server 165 determines that the ECGI returned with response 580 is a mECGI (i.e., UE 105 is connected to BS 115), location server 165 may use a macro method to obtain the updated GPS location of UE 105. For example, location server 165 may initiate a LPP session over a SUPL platform to obtain the updated GPS location of UE 105. If location server 165 determines that the ECGI returned with response 580 is a fECGI (i.e., UE 105 is connected to femto cell 110), location server 165 may generate query 585 that includes the fECGI and may provide query 585 to F2M-MF 125 (e.g., via PGW 140). F2M-MF 125 may receive query 585 and may determine the GPS location of femto cell 110 (e.g., the fGPS) based on the fECGI provided in query 585. F2M-MF 125 may provide, to location server 165 (e.g., via PGW 140), response 585 that includes the fGPS. Location server 165 may receive response 585 and may utilize the GPS location of femto cell 110 (e.g., the fGPS) to approximate the updated GPS location of UE 105.

Systems and/or methods described herein may support emergency calls (e.g., E911 calls) over a network of mixed macro cells and femto cells. In one example implementation, the systems and/or methods may utilize VoIP over a LTE network to support E911 calls, but may also support E911 calls over eHRPD networks or a mixture of LTE and eHRPD networks. The systems and/or methods may determine whether a UE is associated with a femto cell or a macro cell, may determine the UE's (or caller's) initial location, and may determine the UE's (or caller's) updated location.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 6-11, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device, the method comprising:
   receiving, by the computing device and from a femto management subsystem (FMS) device, a request to update a femto cell to macro cell mapping function (F2M-MF) table;
   updating, by the computing device, the femto cell to macro cell mapping function table based on the request;
   receiving, by the computing device and from a proxy call session control function (P-CSCF) device, a query for a macro E-UTRAN cell global identifier (ECGI) and a femto global positioning system (GPS) identifier of a user equipment (UE) when an emergency call is placed by the UE, where the macro ECGI and the femto GPS identifier correspond to a femto ECGI of the UE; and
   providing, by the computing device and to the P-CSCF device, the macro ECGI and the femto GPS identifier of the UE based on the query received from the P-CSCF device.

2. The method of claim 1, further comprising:
   receiving, from a location server, a query that includes the femto ECGI of the UE, when an ECGI associated with the UE corresponds to the femto ECGI; and
   providing, based on the location server query, the femto GPS identifier of the UE to the location server, where the location server uses the femto GPS identifier to approximate a location of the UE.

3. The method of claim 1, where the femto cell to macro cell mapping function table includes a mapping of the macro ECGI, the femto GPS identifier, and the femto ECGI associated with the UE.

4. The method of claim 1, where the computing device comprises a F2M-MF device.

5. A method implemented by a computing device, the method comprising:
   receiving, by the computing device and from a user equipment (UE), an emergency call via a session initiation protocol (SIP) invite, where the SIP invite includes a femto E-UTRAN cell global identifier (ECGI) associated with the UE;
   providing, by the computing device and to a femto cell to macro cell mapping function (F2M-MF) device, a query for a macro ECGI and a femto global positioning system (GPS) identifier corresponding to the femto ECGI;
   receiving, by the computing device and from the F2M-MF device, the macro ECGI and the femto GPS identifier based on the query;
   replacing, by the computing device, the femto ECGI with the macro ECGI and the femto GPS identifier in the SIP invite to produce a modified SIP invite for the emergency call; and
   providing, by the computing device, the modified SIP invite to a serving or emergency call session control function (S/E-CSCF) device for further processing.

6. The method of claim 5, where the computing device comprises a proxy call session control function (P-CSCF) device.

7. A method implemented by a computing device, the method comprising:
   receiving, by the computing device and from a proxy call session control function (P-CSCF) device, an emergency call via a session initiation protocol (SIP) invite, where the SIP invite includes a macro E-UTRAN cell global identifier (ECGI) and a femto global positioning system (GPS) identifier associated with a user equipment (UE) placing the emergency call;
   adding, by the computing device, an Internet protocol (IP) address of the UE to the SIP invite in order to produce a modified SIP invite;
   providing, by the computing device, the modified SIP invite to an emergency call server (ECS);
   receiving, from the ECS and based on the modified SIP invite, a message that includes an emergency service routing key (ESRK) and an emergency service routing network (ESRN); and
   routing, by the computing device, the emergency call to a public safety answering point (PSAP) based on the ESRK and the ESRN.

8. The method of claim 7, where the ESRK is used as a reference key by the PSAP to query the ECS for a GPS location of the UE.

9. The method of claim 7, where the message includes a SIP multiple choice message.

10. The method of claim 7, where the computing device comprises a serving or emergency call session control function (S/E-CSCF) device.

11. A method implemented by a computing device, the method comprising:
- receiving, by the computing device and from a serving or emergency call session control function (S/E-CSCF) device, an emergency call via a session initiation protocol (SIP) invite, where the SIP invite includes a macro E-UTRAN cell global identifier (ECGI), a femto global positioning system (GPS) identifier, and an Internet protocol (IP) address associated with a user equipment (UE) placing the emergency call;
- using, by the computing device, a public safety answering point (PSAP) routing table to determine a PSAP serving the macro ECGI;
- allocating, by the computing device, an emergency service routing key (ESRK) and an emergency service routing network (ESRN) to a message based on the determined PSAP;
- providing, by the computing device, the message to the S/E-CSCF device;
- receiving, by the computing device and from the determined PSAP, a first query for an initial GPS location of the UE; and
- providing, by the computing device and to the determined PSAP, the femto GPS identifier based on the first query.

12. The method of claim 11, further comprising:
- receiving, from the determined PSAP, a second query for an updated GPS location of the UE;
- providing, to a location server and based on the second query, a third query that includes a telephone number, the IP address, and the femto GPS identifier associated with the UE;
- receiving, from the location server and based on the third query, the updated GPS location of the UE; and
- providing, to the determined PSAP, the updated GPS location of the UE.

13. The method of claim 11, where the computing device comprises an emergency call server (ECS).

14. A method implemented by a computing device, the method comprising:
- receiving, by the computing device and from an emergency call server (ECS), a query that includes a telephone number, a femto global positioning system (GPS) identifier, and an Internet protocol (IP) address associated with a user equipment (UE) placing an emergency call;
- obtaining, by the computing device, a serving cell E-UTRAN cell global identifier (ECGI) of the UE based on the query; and
- determining, by the computing device, whether the ECGI is a macro ECGI associated with a base station or a femto ECGI associated with a femto cell.

15. The method of claim 14, where the ECGI is obtained directly from the UE.

16. The method of claim 15, further comprising:
- continuing, when the ECGI is a macro ECGI, a location positioning protocol (LPP) session over a secure user plane location (SUPL) platform to obtain, from the UE, a GPS location of the UE;
- retrieving, from a femto cell to macro cell mapping function (F2M-MF) device and when the ECGI is a femto ECGI, an updated femto GPS identifier of the UE; and
- using, when the ECGI is a femto ECGI, the updated femto GPS identifier to approximate the GPS location of the UE.

17. The method of claim 16, further comprising:
- providing the GPS location of the UE to the ECS in response to the query received from the ECS.

18. The method of claim 14, where the ECGI is obtained from a mobility management entity (MME) device.

19. The method of claim 18, further comprising:
- initiating, when the ECGI is a macro ECGI, a location positioning protocol (LPP) session over a secure user plane location (SUPL) platform to obtain, from the UE, a GPS location of the UE;
- retrieving, from a femto cell to macro cell mapping function (F2M-MF) device and when the ECGI is a femto ECGI, an updated femto GPS identifier of the UE; and
- using, when the ECGI is a femto ECGI, the updated femto GPS identifier to approximate the GPS location of the UE.

20. The method of claim 19, further comprising:
- providing the GPS location of the UE to the ECS in response to the query received from the ECS.

21. A computing device, comprising:
- a memory to store a plurality of instructions; and
- a processor to execute instructions in the memory to:
  - receive, from an emergency call server (ECS), a query that includes a telephone number, a femto global positioning system (GPS) identifier, and an Internet protocol (IP) address associated with a user equipment (UE) placing an emergency call,
  - obtain a serving cell E-UTRAN cell global identifier (ECGI) of the UE based on the query, and
  - determine whether the ECGI is a macro ECGI associated with a base station or a femto ECGI associated with a femto cell.

22. The computing device of claim 21, where the ECGI is obtained directly from the UE, and where the processor is further to execute instructions in the memory to:
- continue, when the ECGI is a macro ECGI, a location positioning protocol (LPP) session over a secure user plane location (SUPL) platform to obtain, from the UE, a GPS location of the UE,
- retrieve, from a femto cell to macro cell mapping function (F2M-MF) device and when the ECGI is a femto ECGI, an updated femto GPS identifier of the UE, and
- use, when the ECGI is a femto ECGI, the updated femto GPS identifier to approximate the GPS location of the UE.

23. The computing device of claim 22, where the processor is further to execute instructions in the memory to:
- provide the GPS location of the UE to the ECS in response to the query received from the ECS.

24. The computing device of claim 21, where the ECGI is obtained from a mobility management entity (MME) device and where the processor is further to execute instructions in the memory to:
- initiate, when the ECGI is a macro ECGI, a location positioning protocol (LPP) session over a secure user plane location (SUPL) platform to obtain, from the UE, a GPS location of the UE,
- retrieve, from a femto cell to macro cell mapping function (F2M-MF) device and when the ECGI is a femto ECGI, an updated femto GPS identifier of the UE, and
- use, when the ECGI is a femto ECGI, the updated femto GPS identifier to approximate the GPS location of the UE.

25. The computing device of claim 24, where the processor is further to execute instructions in the memory to:
- provide the GPS location of the UE to the ECS in response to the query received from the ECS.

* * * * *